H. J. SMITH.
TRANSFER TICKET.
APPLICATION FILED JUNE 24, 1911.
Reissued June 23, 1914.
13,757.
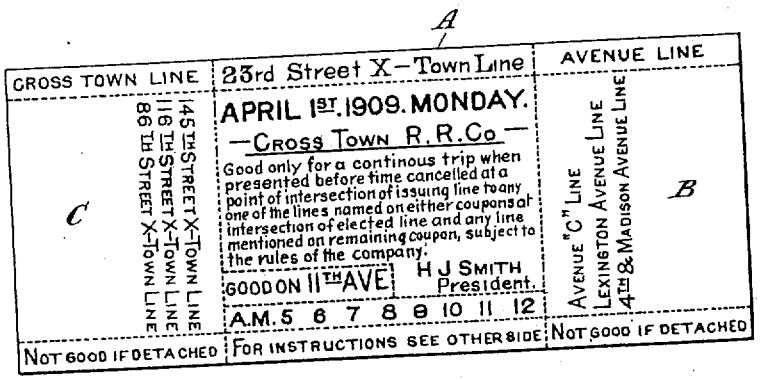
Witnesses:
O. F. Kehoe
P. M. Tilden.
Inventor:
Henry J. Smith
by his Attys
Philip Barcroft Rice & Kennedy
COLUMBIA PLANOGRAPH CO., WASHINGTON, D. C.

UNITED STATES PATENT OFFICE.

HENRY J. SMITH, OF NEW YORK, N. Y.

TRANSFER-TICKET.

13,757. Specification of Reissued Letters Patent. Reissued June 23, 1914.

Original No. 978,407, dated December 13, 1910, Serial No. 502,407. Application for reissue filed June 24, 1911. Serial No. 635,191.

*To all whom it may concern:*

Be it known that I, HENRY J. SMITH, a citizen of the United States, residing at New York, county of New York, and State of New York, have invented certain new and useful Improvements in Transfer-Tickets, fully described and represented in the following specification and the accompanying drawing, forming a part of the same.

This invention relates to certain improvements in transfer tickets for street railways.

In some cities the conditions under which street railways are operated require that a passenger paying his fare upon one line be entitled to transportation to any point on any other line which is a part of the same system. Where the system includes a number of different lines running in various directions, this often requires that the passenger be entitled, upon payment of his fare upon a given line, to continue his ride, not only upon an intersecting line, but on another line which intersects the intersecting line. Under some circumstances, the passenger may even be entitled to a ride on still another or fourth line which intersects the second intersecting line. Under the conditions referred to, the usual practice has been for the line on which the passenger pays his fare, or the issuing line, to issue a transfer good on an intersecting line, and possibly also on a line intersecting said intersecting line, the transfer to be given up on the second intersecting line. Should there be, however, a fourth line intersecting the second intersecting line, the passenger may be entitled to ride on that line, provided, of course, it be embraced in the same system, and may, therefore, be entitled to exchange his transfer for a second transfer, which transfer is issued with a new time limit and entitles the passenger to all the privileges which would have resulted had an actual fare been paid upon said line. Where the system is large, embracing numerous intersecting lines, great abuses of the transfer system have resulted, for the reason that a passenger will demand a transfer whether or not he is intending to use it immediately. He leaves the car on which he has been riding, therefore, with a transfer which is "alive" and which will remain alive for the time limit for which it is punched. If within that time limit he boards a car upon a line on which his transfer is good, he may be able to exchange it for another transfer which is again issued with a new time limit. In large cities where the travel is heavy and where conductors cannot pay close attention to time limits, this may, and in some cases practically does result in an almost indefinite issuance of transfers.

Transfers are usually so issued as to be good only in one general direction, that is to say, a passenger having elected to travel in a given direction cannot, thereafter, reverse his direction of travel over the same line or any other line which parallels it. Assuming, for instance, that a passenger boards a car on a cross-town line, he may, at the intersecting point, elect to travel either up or down with respect to the cross-town line. If he elects to go down, he may, further down the line, board another cross-town intersecting line and travel in either direction on that line, but when he leaves the second-cross-town car, he can only travel on the next intersecting line in the down direction. If, however, within the time limit of his transfer on a line going in one direction, he boards a car on any line going in the opposite direction, and, paying a fare, obtains a transfer which gives an uptown privilege, he may then, by changing his transfers within their time limits, continue his travel in either direction practically indefinitely, having paid only two fares.

The object of this invention is to produce an improved transfer ticket by which a passenger may obtain a continuous ride between any two points on a system, the privilege of the transfer being extinguished by the use of the transfer within the time limit or by the lapse of the time limit set when the transfer is originally issued, in case the transfer is not used within that limit.

Referring to the drawing which illustrates a transfer ticket constructed in accordance with the invention, A indicates a body portion which bears the name of the issuing line, the contract under which the transfer is issued, and a series of time limit indications, these comprising, on the ticket illustrated, the hours from five o'clock in the morning until noon. This body portion has attached to it two coupons B and C, these coupons in the ticket illustrated, being attached to different ends of the body portion. The coupon B bears the names of three lines which are assumed to be in the same system with the issuing line and on which the transfer will be good, provided the coupon when presented, be attached to the body portion, these lines being lines which intersect the issuing line. The coupon C bears the names of three lines on which this coupon is good, provided it be attached to the body portion when presented, it being assumed that these lines are lines which intersect the lines named on the coupon B. It may happen, and frequently does in large systems, that some or all of the lines named on the transfer may intersect at a common transfer point, in which case the passenger must be privileged to elect as to which coupon he will first use. It is, therefore, important, though not essential, that the coupons be attached to the central or body portion so that either one may be removed without detaching the other, which is accomplished in the ticket illustrated by attaching the coupons to different ends or sides of the central or body portion.

With the transfer described, and assuming it to be issued by the 23rd Street X-town line on which the passenger begins his ride and on which he pays his fare,—the time limit being punched on the transfer at this time,—he may continue his ride, at the intersection of the X-town line, on any one of the three lines named on the coupon B which are assumed to be lines intersecting the X-town line. He presents his transfer on the selected intersecting line and the conductor tears off the coupon B. After having traveled as far as desired on the selected intersecting line, he may still continue his ride on any of the lines named on coupon C, provided, however, he presents the transfer within the time limit punched on the body portion of the transfer. Upon presentation of his transfer with the attached coupon C on this third selected line, the conductor on this line will take up the transfer and coupon C. Further, if it be assumed that the issuing line and any of the lines named on the two coupons have a common intersecting point, the transfer enables the passenger to elect as to whether he will continue his ride on a line named on coupon C or on a line named on coupon B. The ticket described, therefore, enables a passenger to ride between any two points in the system which can be reached by three continuous rides, and, further, enables him to elect, at a common intersecting point, in which order he will take the second and third rides provided, which is of essential importance as the street railway systems of most large cities are laid out. It may happen, under some circumstances, however, that a fourth ride will be necessary to reach some point in the system. This may be provided for by a statement on the body or central portion of the ticket that the holder thereof is entitled to a ride on the line referred to. When such a transfer is presented on the third line the conductor will not take up the body of the ticket but will detach the coupon C, leaving the body of the ticket to be taken up by the conductor on the fourth line. In the ticket illustrated, this is provided for by the words "Good on 11th Ave." on the body portion of the transfer.

It will be understood, therefore, that the transfer described provides, at the time of issuance, for the necessary rides between any two points on the system, thus making any exchange of transfers unnecessary. Further, when the transfer is issued, the time limit within which the rides may be taken is fixed, as the time cannot be extended by exchanging the transfer for another extending the time. Furthermore, the transfer operates as a check upon the issuing conductor, as each conductor must account in cash for the number of transfers he has issued, since in no case will a transfer be issued except for a paid fare. Further, since a ride cannot be obtained by simply exhibiting a transfer and holding it for use on an additional line, a conductor at the end of a trip must be able to show either cash or a transfer for every passenger who has boarded his car during the trip. The transfer possesses other advantages which need not be here recited, inasmuch as they will be obvious to those who are accustomed to street railway operation.

The construction by which the invention is carried into effect may be varied in some respects from the particular transfer illustrated. The invention is not, therefore, to be limited to the specific transfer illustrated and hereinbefore described.

What is claimed is:

1. A transfer ticket comprising a central or body portion bearing a contract under which the ticket is used and a series of time limit indications, said body portion having a detachable coupon attached thereto bearing indicia defining a line intersecting the issuing line on which the coupon is good, said body portion also having a second detachable coupon attached thereto which bears indicia defining a line intersecting the before mentioned intersecting line on which the second coupon is good, the ticket also bearing indicia to the effect that the coupons are valid only when attached to the body portion, whereby a passenger, within the time limit for which the ticket is punched, is entitled to a continuous ride on the issuing line, an intersecting line, and a line intersecting the intersecting line, the ticket being canceled either by the lapse of the time for which it is punched or by the use of the coupons.

2. A transfer ticket comprising a body portion bearing a contract under which the ticket is used and a series of time limit indications, said ticket having a detachable coupon bearing indicia indicating a plurality of lines intersecting the issuing line, on any of which the coupon is good within the time limit of the body portion, said ticket also having a second detachable coupon which bears indicia defining a plurality of different lines intersecting the before named intersecting lines, said second coupon being good on a selected intersecting line named on it within the time limit of the body portion.

In testimony whereof, I have hereunto set my hand, in the presence of two subscribing witnesses.

HENRY J. SMITH.

Witnesses:
A. WHITE,
T. F. KEHOE.

Copies of this patent may be obtained for five cents each, by addressing the "Commissioner of Patents, Washington, D. C."